US008641498B1

(12) United States Patent
Phillips

(10) Patent No.: US 8,641,498 B1

(45) Date of Patent: Feb. 4, 2014

(54) VIDEO POKER GAME SYSTEM AND METHOD

(76) Inventor: Rob L. Phillips, Las Vegas, NV (US)

( * ) Notice: Subject to any disclaimer, the term of this patent is extended or adjusted under 35 U.S.C. 154(b) by 136 days.

(21) Appl. No.: 12/939,003

(22) Filed: Nov. 3, 2010

(51) Int. Cl.
*A63F 9/24* (2006.01)
*A63F 13/00* (2006.01)

(52) U.S. Cl.
USPC .................. 463/13; 463/10; 463/16; 463/20; 273/138.1; 273/138.2; 273/292

(58) Field of Classification Search
USPC ............ 463/13, 16, 20, 10; 273/138.1, 138.2, 273/292
See application file for complete search history.

(56) References Cited

U.S. PATENT DOCUMENTS

| | | | | | |
|---|---|---|---|---|---|
| 5,976,016 | A * | 11/1999 | Moody et al. | 463/13 |
| 6,007,066 | A * | 12/1999 | Moody | 273/292 |
| 6,220,959 | B1 * | 4/2001 | Holmes et al. | 463/13 |
| 6,428,002 | B1 * | 8/2002 | Baranauskas | 273/236 |
| 6,435,509 | B2 * | 8/2002 | Wichinsky et al. | 273/292 |
| 6,443,456 | B1 * | 9/2002 | Gajor | 273/303 |
| 6,471,210 | B1 * | 10/2002 | Goldman et al. | 273/292 |
| 6,568,680 | B1 * | 5/2003 | Moody et al. | 273/292 |
| 6,638,163 | B2 * | 10/2003 | Moody | 463/13 |
| 7,000,921 | B2 * | 2/2006 | Schultz | 273/292 |
| 7,007,953 | B1 * | 3/2006 | Cabot | 273/292 |
| 7,780,169 | B2 * | 8/2010 | Breslo | 273/269 |
| 2002/0043765 | A1 * | 4/2002 | Moody | 273/292 |
| 2003/0162577 | A1 * | 8/2003 | Hamud | 463/13 |
| 2004/0127276 | A1 * | 7/2004 | Moody | 463/13 |
| 2006/0105828 | A1 * | 5/2006 | FitzGerald et al. | 463/13 |
| 2006/0267284 | A1 * | 11/2006 | Jackson | 273/292 |

* cited by examiner

*Primary Examiner* — Dmitry Suhol
*Assistant Examiner* — Ryan Hsu
(74) *Attorney, Agent, or Firm* — Greenberg Traurig, LLP; Rob L. Phillips

(57) ABSTRACT

A video poker style game premised on stud poker and draw poker. In one version, a video poker device utilizes a simulated standard deck of 52 playing cards to facilitate play of the game. The video poker device causes ten, five-card poker hands to be displayed on a video poker device display. Depending on wagers placed, the strength of the ten, five-card poker hands determines a player payout. Players may also select in advance less than all ten poker hands to wager on. The two remaining cards not used in any of the ten five-card poker hands may be designated as wild or used to form seven-card poker hands with each of the ten five-card poker hands or player-selected hands. Players may also select a hand to play draw poker.

5 Claims, 10 Drawing Sheets

VIDEO POKER GAME SYSTEM AND METHOD

FIELD OF THE INVENTION

The embodiments of the present invention relate to a poker game facilitated by an electronic gaming device.

BACKGROUND

Basic video poker and its variations are very popular in the casinos. Reasons for the popularity stem from ease of play, quickness of play and the poker premise. Most casinos offer large numbers of video poker devices on which players may select from a plurality of video poker games such as Double Double Bonus Poker®, Deuces Wild Poker, Triple Play Poker®, Jacks or Better and various others.

Despite the large numbers of video poker games available and the popularity of the same, there continues to be a need for new and exciting video poker style games to attract new players and retain existing players.

SUMMARY

Accordingly, the embodiments of the present invention comprise a video poker style game premised on stud poker rather than draw poker. In one embodiment, a video poker device utilizes a simulated standard deck of 52 playing cards to facilitate play of the game. The video poker device causes ten, five-card poker hands to be displayed on a video poker device display. Depending on wagers placed, the strength of one or more of the ten, five-card poker hands determines a player payout.

In another embodiment, the two remaining cards not used in the ten, five-card poker hands are used as sixth and seventh cards in each of the ten, five-card hands to determine additional or bonus payouts based on the poker hand formed of the best five cards from one or more of the ten, seven-card hands. In another embodiment, the ranks of one or both of the two remaining card not used in the ten, five-card hands are designated wild cards.

In other embodiments, the player is able to select which of the ten, five-card hands to play and/or wager upon prior to the cards being revealed. In yet another embodiment, a selected hand may be played as a draw hand.

Other variations, embodiments and features of the present invention will become evident from the following detailed description, drawings and claims.

DETAILED DESCRIPTION

Figure 1A:
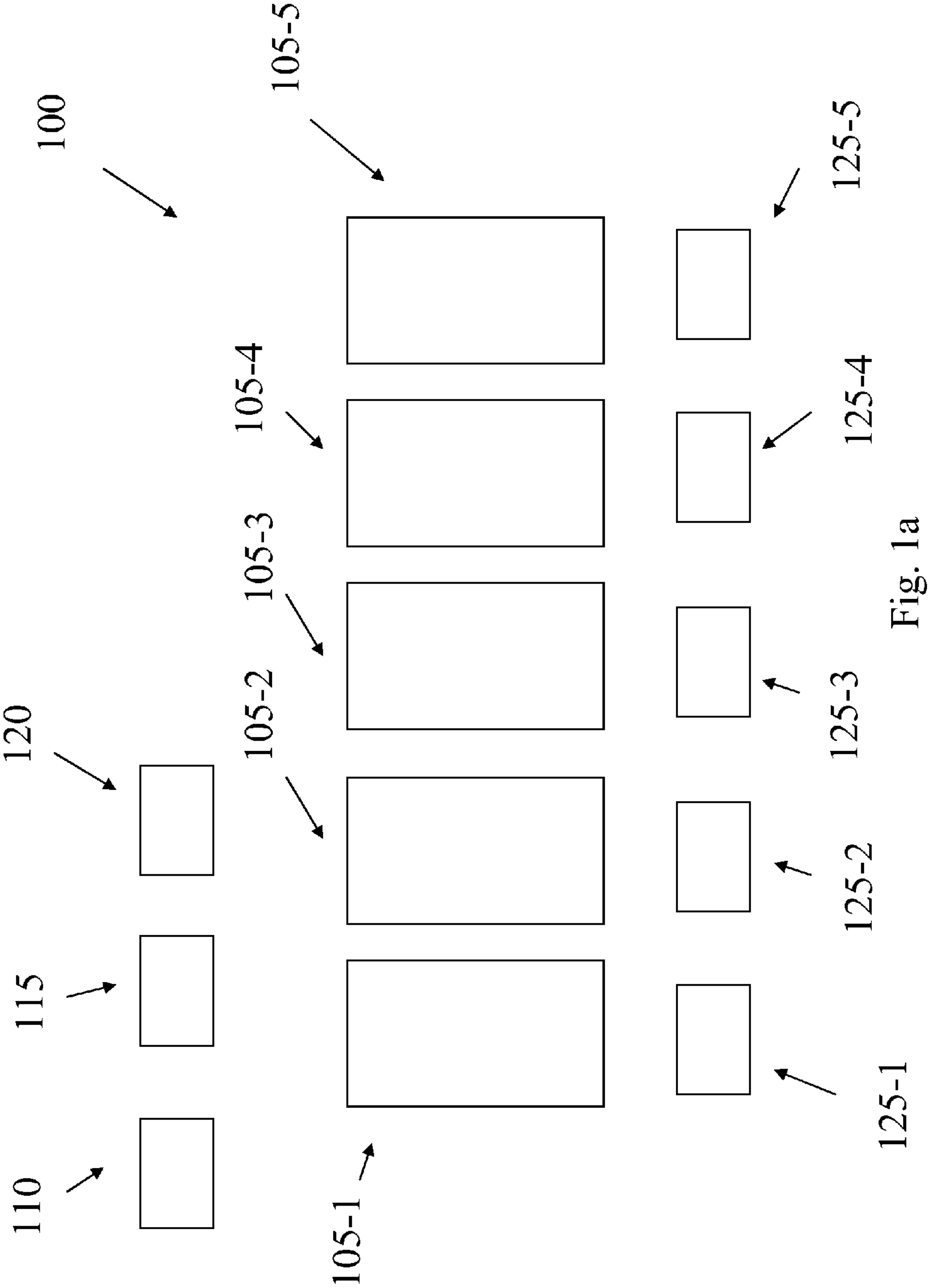
FIGS. 1*a*-1*d* illustrate screen shots of a conventional video poker game.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Conventional video poker consists of a player placing a wager, five random cards being displayed face-up; the player selecting which cards to hold and discard; the discards being replaced with new cards; and a payout from a pay table being provided based on the strength of the final poker hand. Accordingly, conventional video poker is premised on draw poker. The embodiments of the present invention are primarily based on stud poker (i.e., no draw). Both conventional video poker and the embodiments of the present invention are facilitated by video poker devices comprising a processor, random number generator, memory, display and user interface (e.g., game buttons or touch screen technology). Those skilled in the art will recognize the technology behind video poker devices such that the details need not be disclosed herein. The embodiments of the present invention may also be facilitated via a server-based system including one or more game terminals linked to a server with the games according to the embodiments maintained thereon. Hand-held devices may also be used to access the Internet or download the games according to the embodiments of the present invention.

Figure 1B:
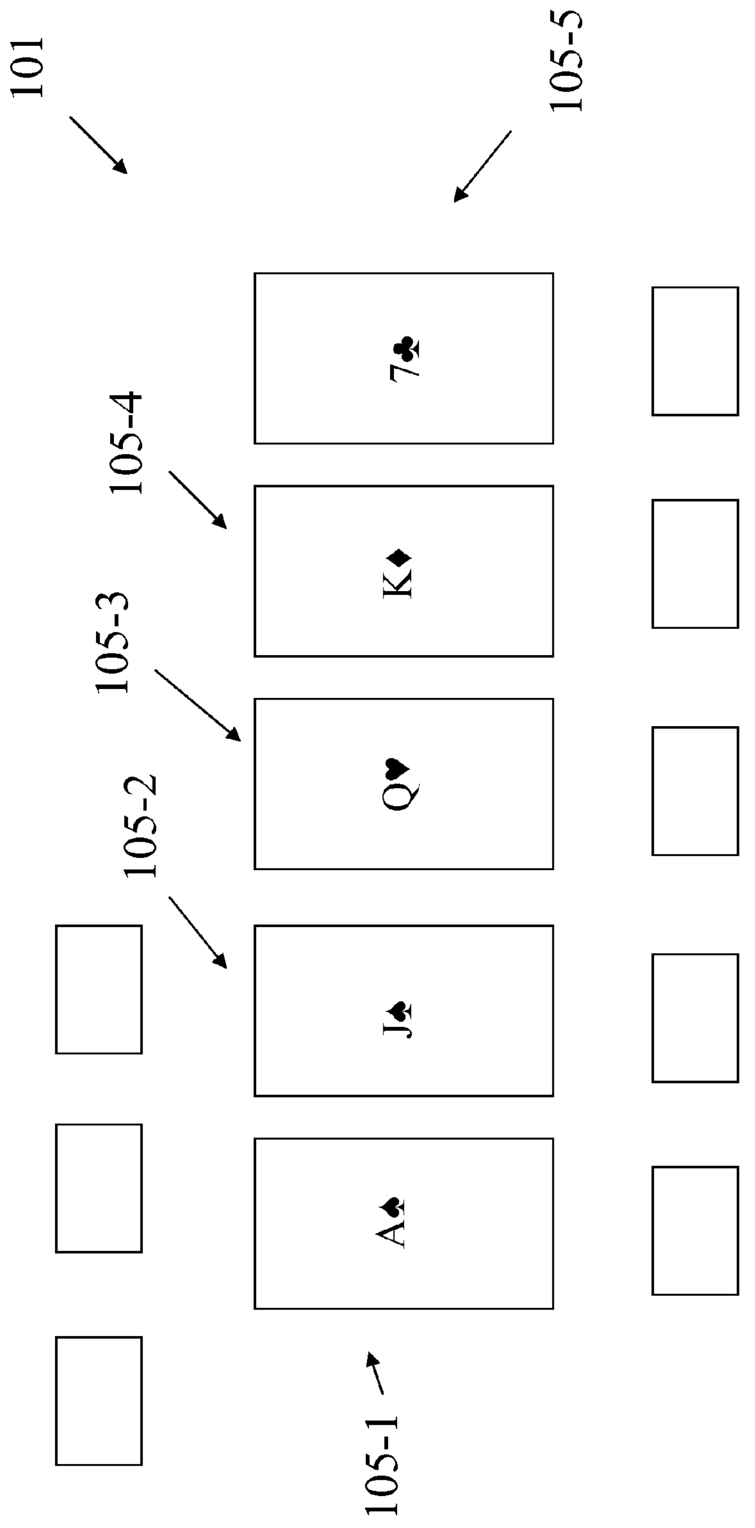
Figure 1C:
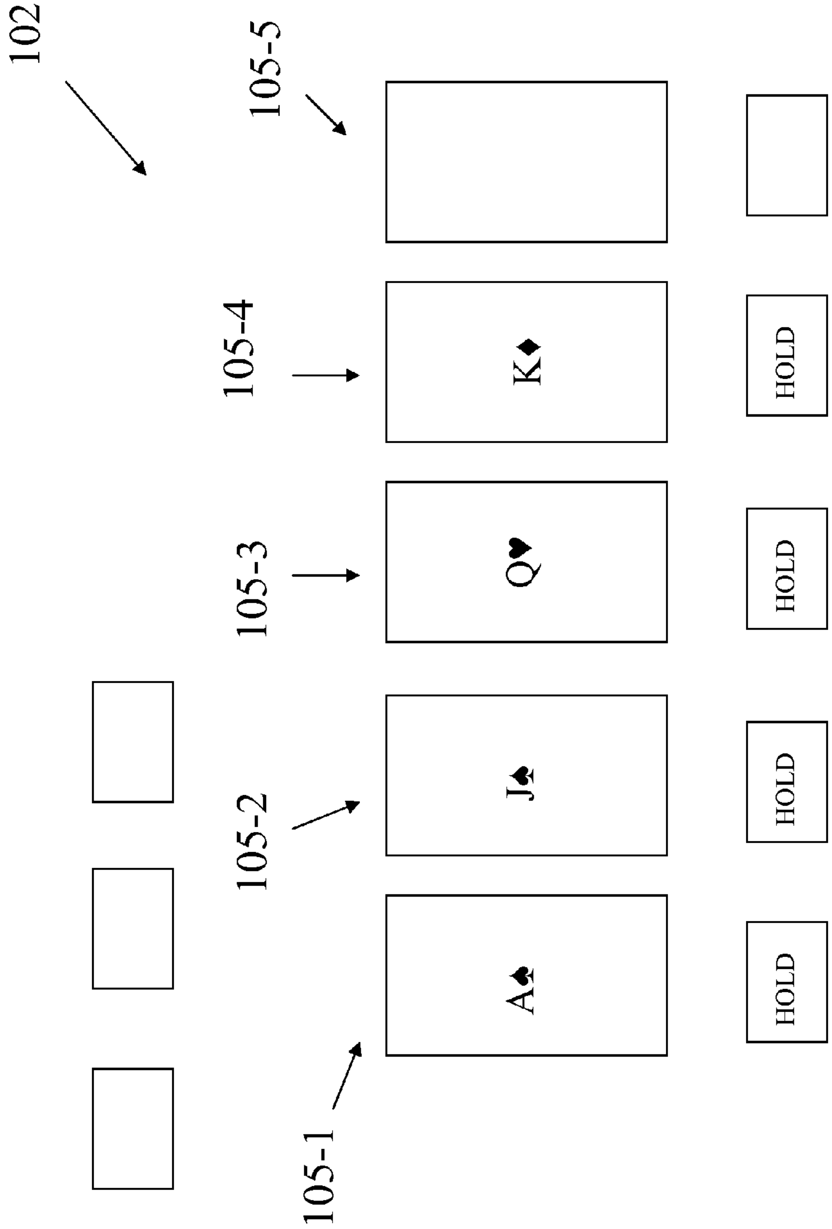
Figure 1D:
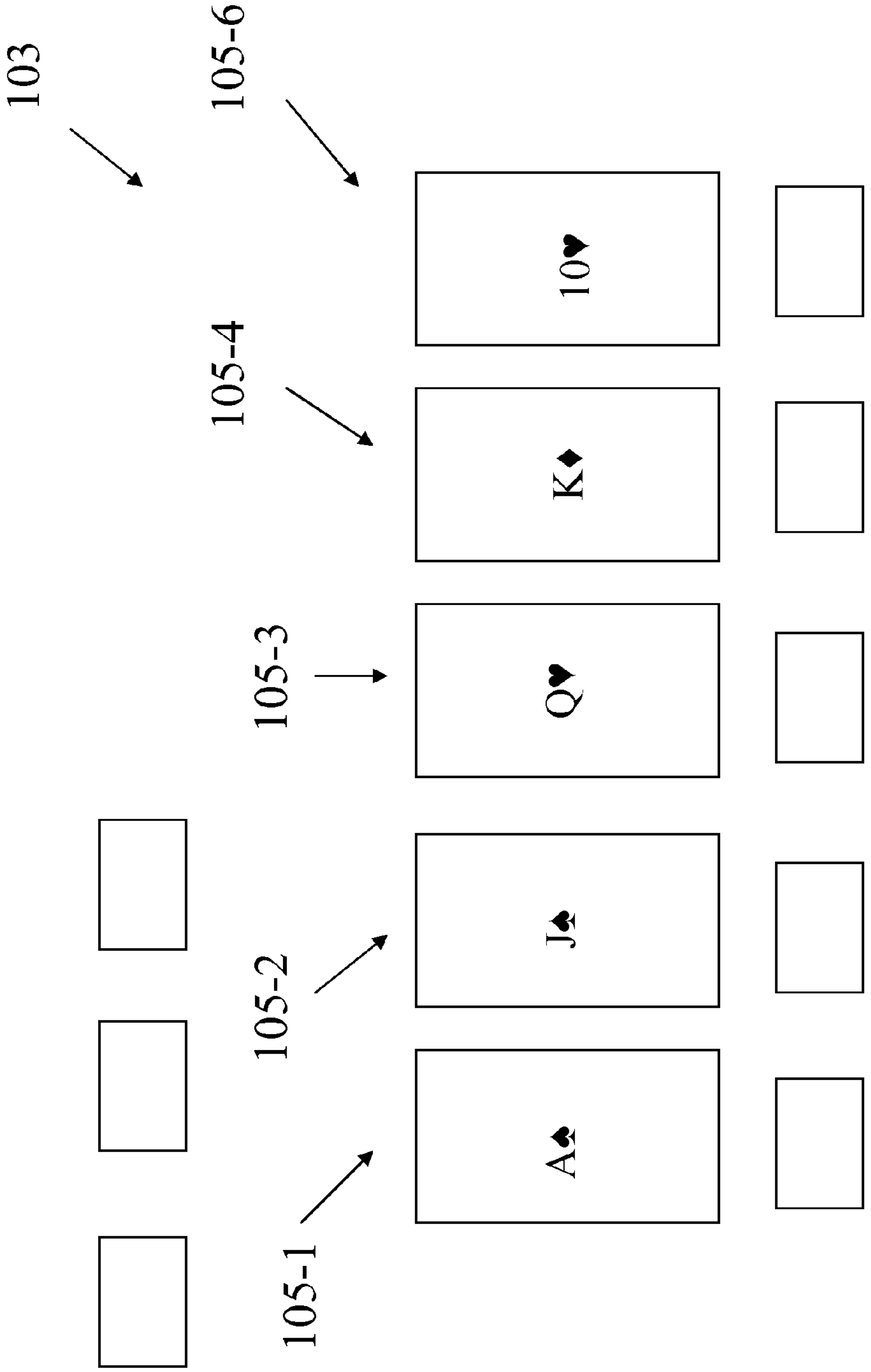

FIG. 1*a* shows a first screen shot 100 associated with a conventional video poker game. The screen shot 100 shows five face-down cards 105-1 through 105-5. The screen shot 100 also depicts a credit meter 110, wager meter 115 and win meter 120. Hold and discard touch screen icons 125-1 through 125-5 are shown below the cards 105-1 through 105-5. Physical game buttons in place of the touch screen icons 125-1 through 125-5 may also be used to allow a player to interface with the game. FIG. 1*b* shows screen shot 101 with the five cards 105-1 through 105-5 revealed. The five cards comprise A♠ 105-1, J♠ 105-2, Q♥ 105-3, K♦ 105-4 and 7♣ 105-5. FIG. 1*c* shows screen shot 102 once the player has elected to hold the with the A♠ 105-1, J♠ 105-2, Q♥ 105-3, K♦ 105-4 and discard the 7♣ 105-5 in the effort to obtain a straight. FIG. 1*d* shows screen shot 103 after the replacement card is revealed in place of the discarded 7♣ 105-5. The replacement card is the 10♥ 105-6 giving the player a straight. The player receives a payout based on a pre-established pay table. Table 1 shows an exemplary pay table associated with conventional video poker.

TABLE 1

| Hand | 1 credit | 2 credits | 3 credits | 4 credits | 5 credits |
|---|---|---|---|---|---|
| Royal Flush | 125 | 250 | 375 | 500 | 2000 |
| Straight Flush | 25 | 50 | 75 | 100 | 125 |
| Four of a kind | 12 | 25 | 37 | 50 | 62 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

Figure 2A:
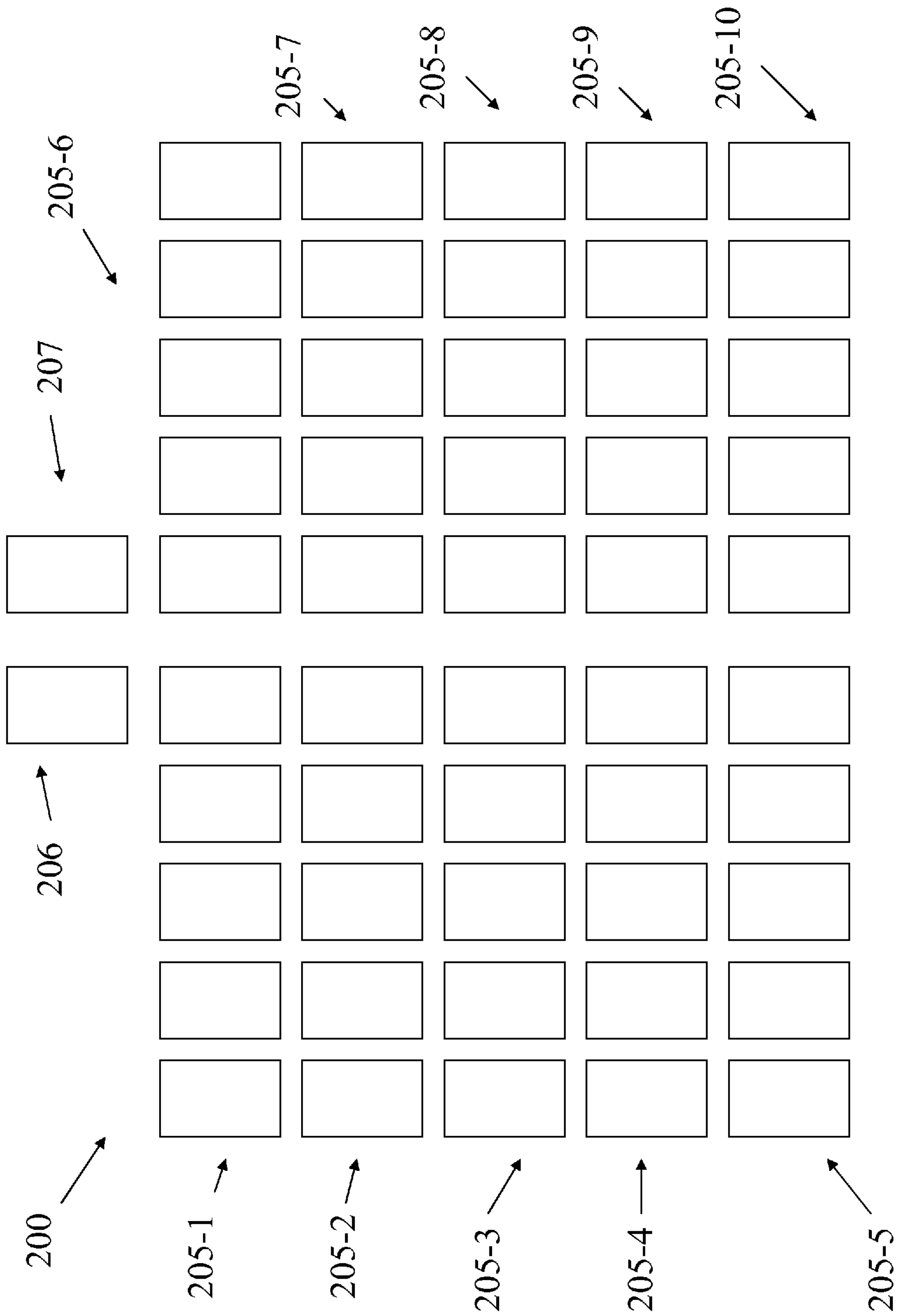
FIGS. 2*a*-2*b* illustrate screen shots of the video poker game according to one embodiment of the present invention.
Figure 2B:
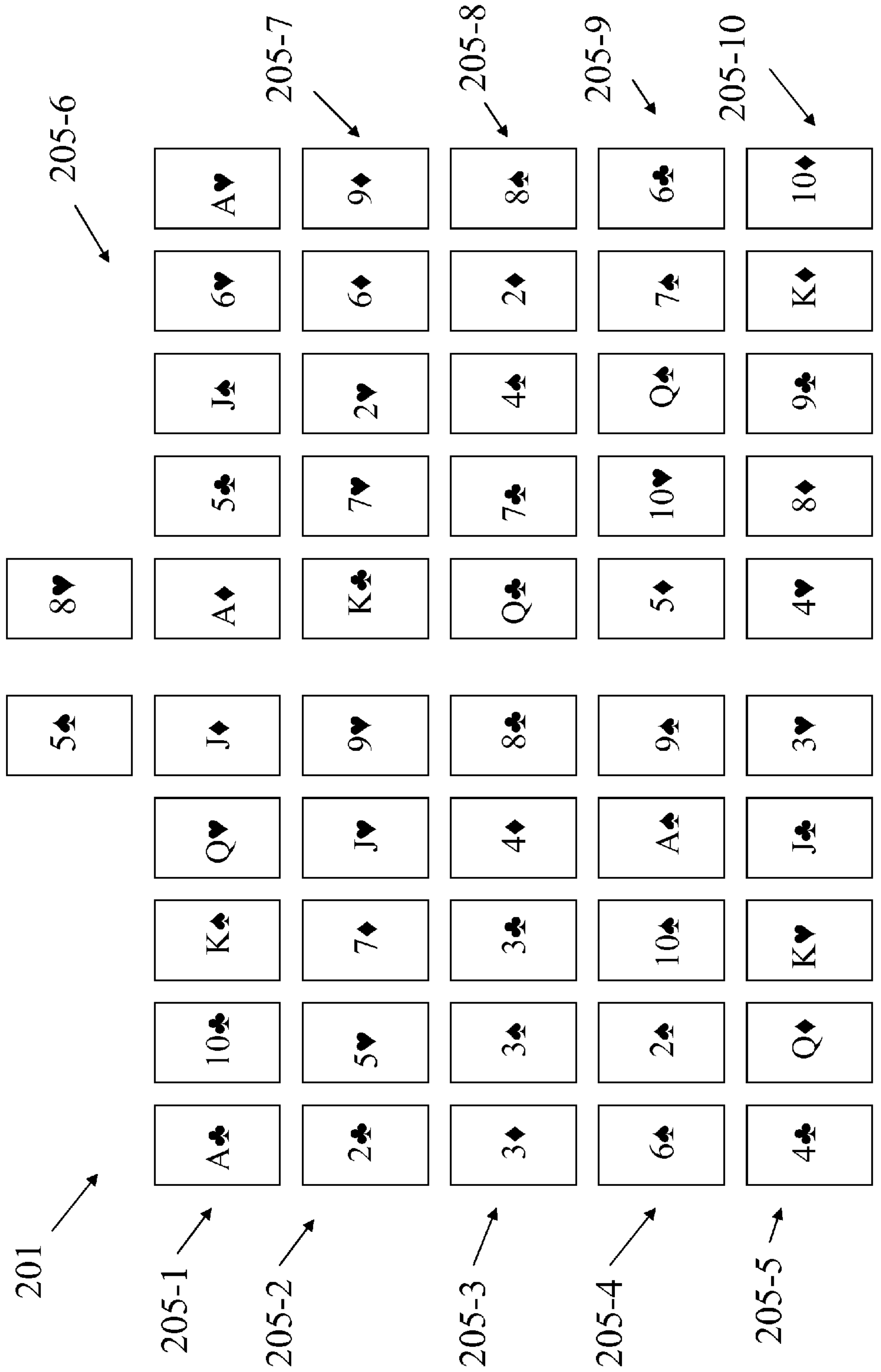
Figure 3:
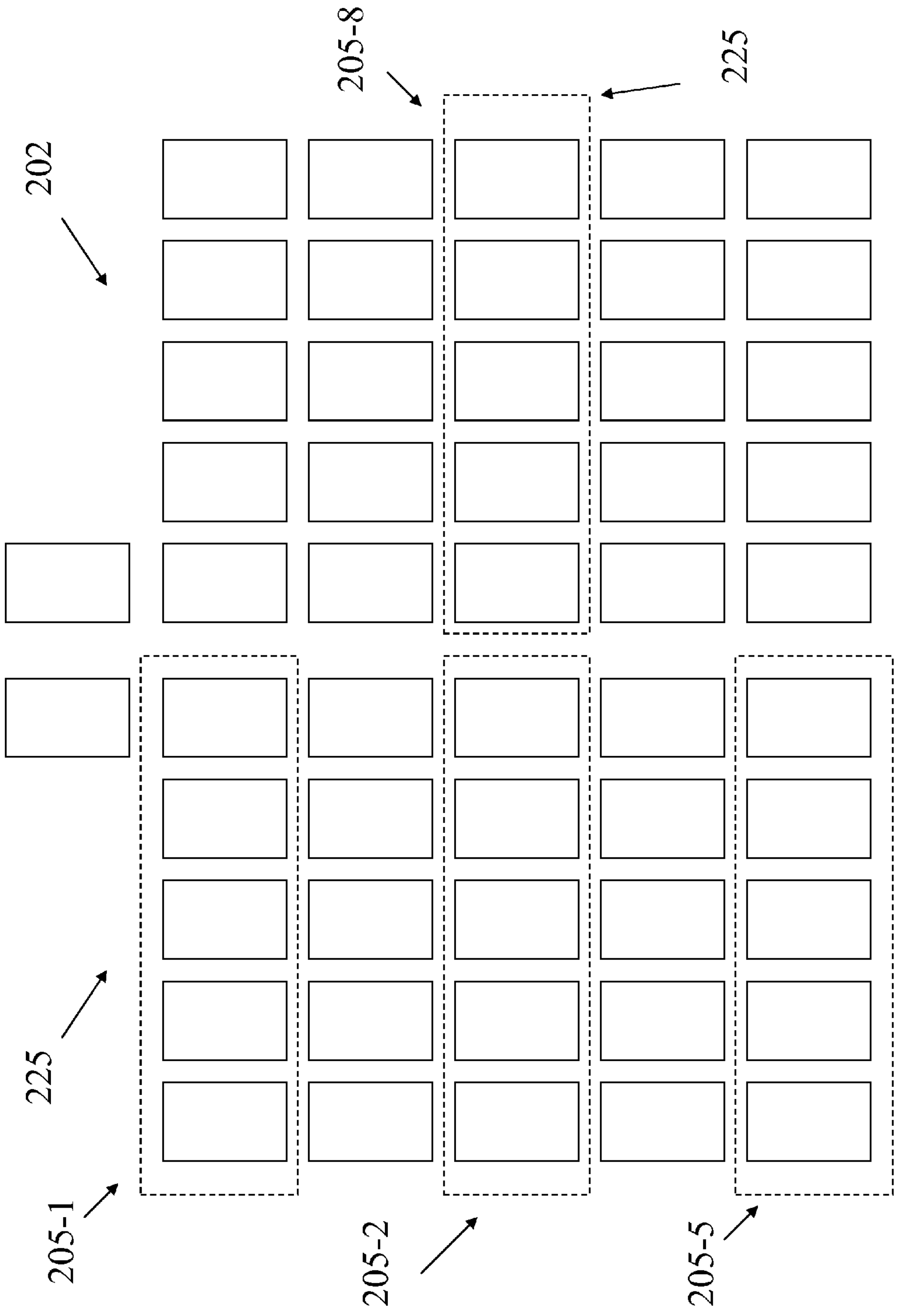
FIG. 3 illustrates a screen shot of a video poker game according to a hand-selection embodiment of the present invention.

Now referring to FIGS. 2*a*-2*b*, a first embodiment of the present invention is detailed. FIG. 2*a* shows an initial screen shot 200 with ten five-card poker hands 205-1 through 205-10 displayed face down. The two remaining cards 206, 207 from the simulated deck of 52 playing cards are displayed face down near a top of the screen shot 200. The player is able to wager on all ten hands or less than all ten hands as shown in FIG. 3. In one embodiment, the player utilizes a touch screen or other game interface to select which of the ten hands to play assuming the player does not want to play all ten hands. Hands selected by the player are highlighted or otherwise differentiated from unselected hands. Wagers may be placed per hand such that on a 0.25¢ machine, the player may pay $2.50 to play all ten hands or $1.25 to play five hands or 0.500 ¢ to play two hands. On a $1.00 machine, the player may wager $10.00 to play ten hands or $5.00 to play five hands. The player may also play multiple and/or different units per hand. Once wagers are made using game credits, or via insertion of currency, coins or coupons, the player presses a deal button or touch screen deal icon. Responsive thereto, as shown in screen shot 201 of FIG. 2*b*, the cards forming all selected hands are revealed along with the two remaining cards 206, 207. In this instance, the player has selected all ten hands 205-1 through 205-10 so that all ten hands 205-1 through 205-10 are revealed. There are various methods for awarding payouts based on the revealed ten hands (or a lesser number of hands as selected by the player). If the player selects less than all ten hands, the selected hands may be revealed first and payouts made, and then the unselected hands may be revealed to show the player the hand rankings of the unselected hands.

In a first embodiment, payouts are paid for each played hand meeting a pre-determined minimum rank (e.g., pair of 8s). The higher the rank, the higher the payout. Such payouts are deemed five-card stud payouts. In another embodiment, the two remaining cards 206, 207 are added to each of the played hands to form seven cards hands responsive to which seven-card stud payouts are paid in addition to the five-card stud payouts or alternatively thereto. Although not mandatory, the pre-determined minimum ranking seven-card stud hand (e.g., pair of Jacks) is of a higher rank than the pre-determined minimum ranking five-card stud hand because of the addition of the two additional cards 206, 207.

Assuming a pair of 8s is the pre-established minimum ranking, FIG. 2*b* shows four winning hands (205-1, 205-3, 205-4 and 205-6) comprising a straight, three of a kind, flush and pair of Aces, respectively. The payout for the hand is the aggregate of the payouts for each of the four winning hands. If the two remaining cards are used to form seven-card hands with a pre-established minimum of a pair of Jacks, three winning hands (205-3, 205-6 and 205-7) are formed comprising a full house, two pair and straight, respectively. In one embodiment, five-card hands having poker ranks exceeding the pre-established seven-card minimum do not qualify for a seven-card payout unless the rank of the five-card hand improves with the added two cards.

In another embodiment, one or both of the extra two cards 206, 207 are deemed wild cards along with other similarly ranked cards in the deck of cards. As shown, the two extra cards 206, 207 comprise the 5♠ and 8♥, respectively. Accordingly, the cards comprising the 5♥, 5♣, 5♦, 8♣ and the 8♠ are designated wild within the hands they were dealt. As shown in FIG. 2*b*, six hands (205-2, 205-3, 205-6, 205-8, 205-9 and 205-10) include wild cards. If the wild cards are the same rank (e.g., 2♦, 2♥) there is only one wild rank and two designated wild cards (e.g., 2♣, 2♠) within the ten hands instead of six wild cards. Payouts are based on poker hands above threshold rank (e.g., pair of Aces) given the inclusion of wild cards. Multiple hands (205-3, 205-6) have improved to a four of a kind and three of a kind, respectively. The payouts may be lower than non-wild embodiments or hand rankings may be different than the other embodiments. A player may also be given the chance to select one or both of the extra cards 206, 207 to be wild cards prior to any cards being selected. That is, the player can select the first or second card, or both, as the wild card(s). The player may be required to pay extra to select one or both of the extra cards 206, 207 as wild cards.

In another embodiment, a player may designate, prior to any cards being dealt, one of the poker hands as a draw hand. In such an embodiment, once the stud hands are complete and associated wagers are resolved, the player is able to play the selected hand as a draw hand. All cards not included in the selected poker hand are reshuffled. The player then selects which cards to hold or discard. The discards are replaced with cards from the reshuffled deck. The strength of the final poker hand is then used to determine a payout. Alternatively, a random hand may be designated by the system as the draw hand. Alternatively, the strongest hand after the cards are displayed is designated as the draw hand.

FIG. 3 shows a screen shot 202 wherein a player has selected hands 205-1, 205-3, 205-5 and 205-8 to play. In such an embodiment the player's wager is adjusted based on the number of hands played. Playing all ten hands may afford the player a discount. The selected hands 205-1, 205-3, 205-5 and 205-8 may be highlighted in any suitable manner including placement of boxes 225 around the hands, bolding the hands, coloring the hands and any other suitable mechanism for distinguishing the selected hands from non-selected hands.

Figure 4:
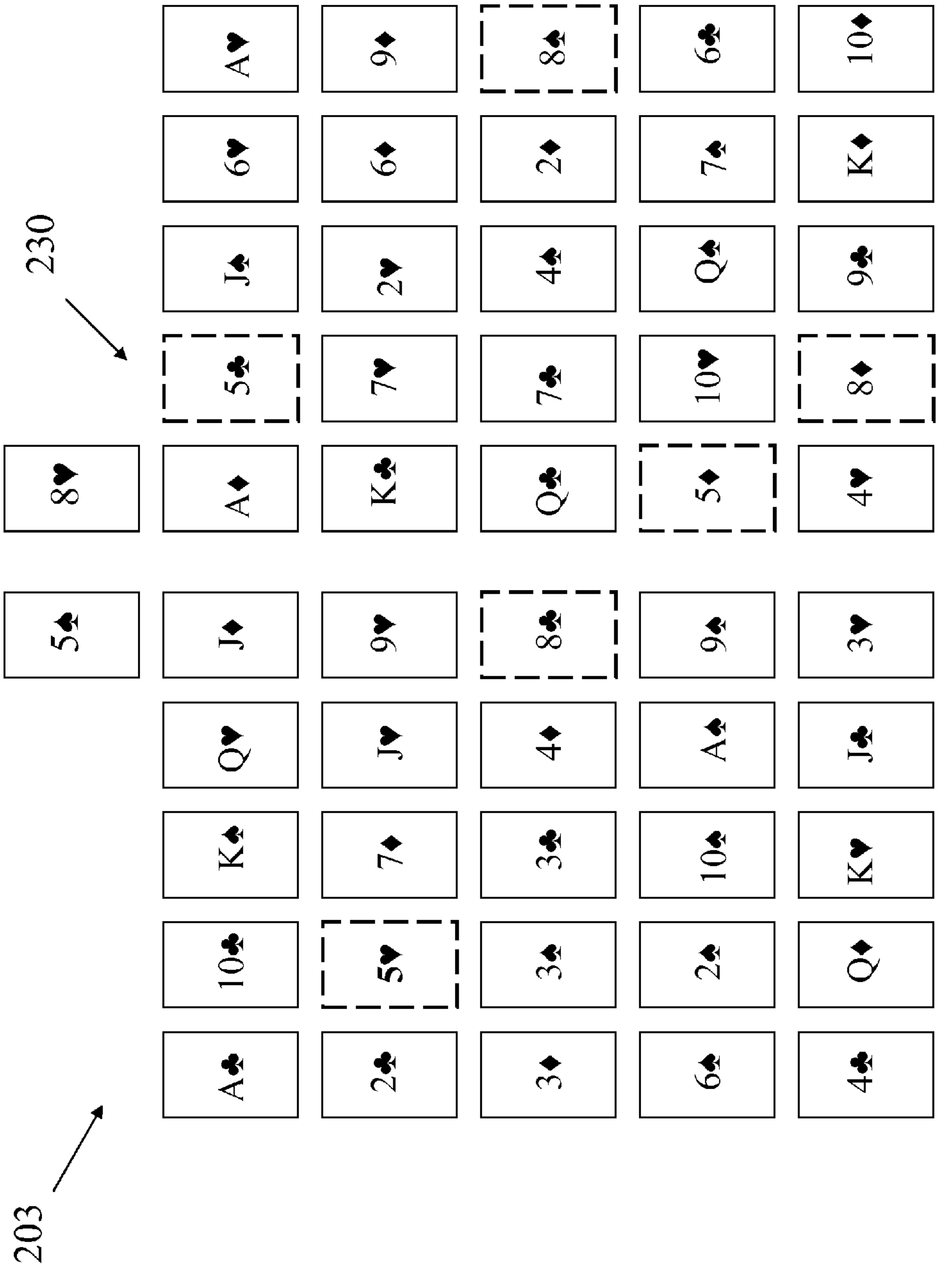
FIG. 4 illustrates a screen shot of a video poker game according to a wild card embodiment of the present invention.
Figure 5:
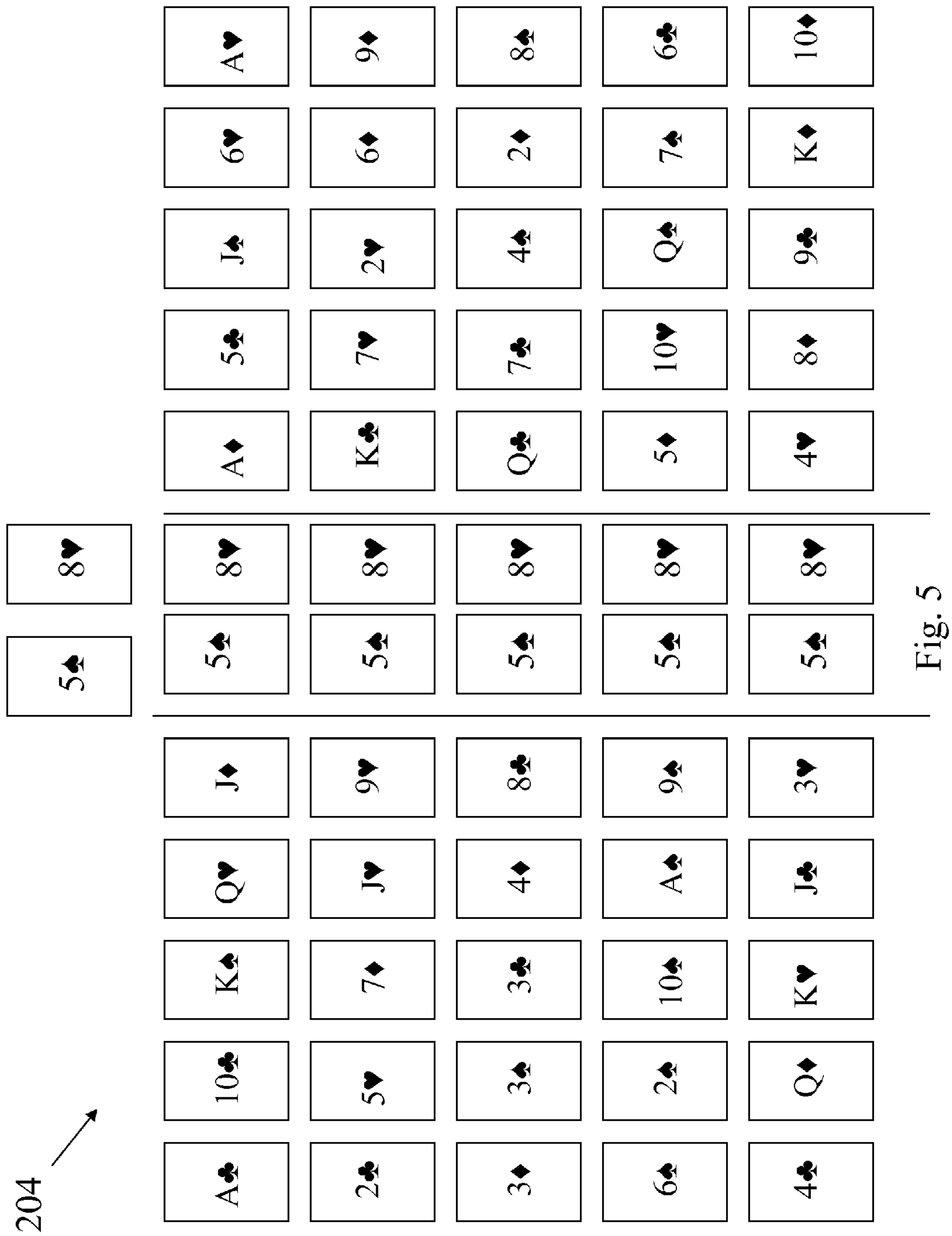
FIG. 5 illustrates a screen shot of a video poker game according to a seven card selection embodiment of the present invention.

FIG. 4 shows a screen shot 203 wherein the wild cards are highlighted by hatching the border 230 of the wild cards. FIG. 5 shows a screen shot 204 wherein seven-card hands are formed using the extra two cards. In one embodiment, the two extra cards 206, 207 are replicated adjacent to each of the selected hands (as shown all ten hands have been selected).

Figure 6:
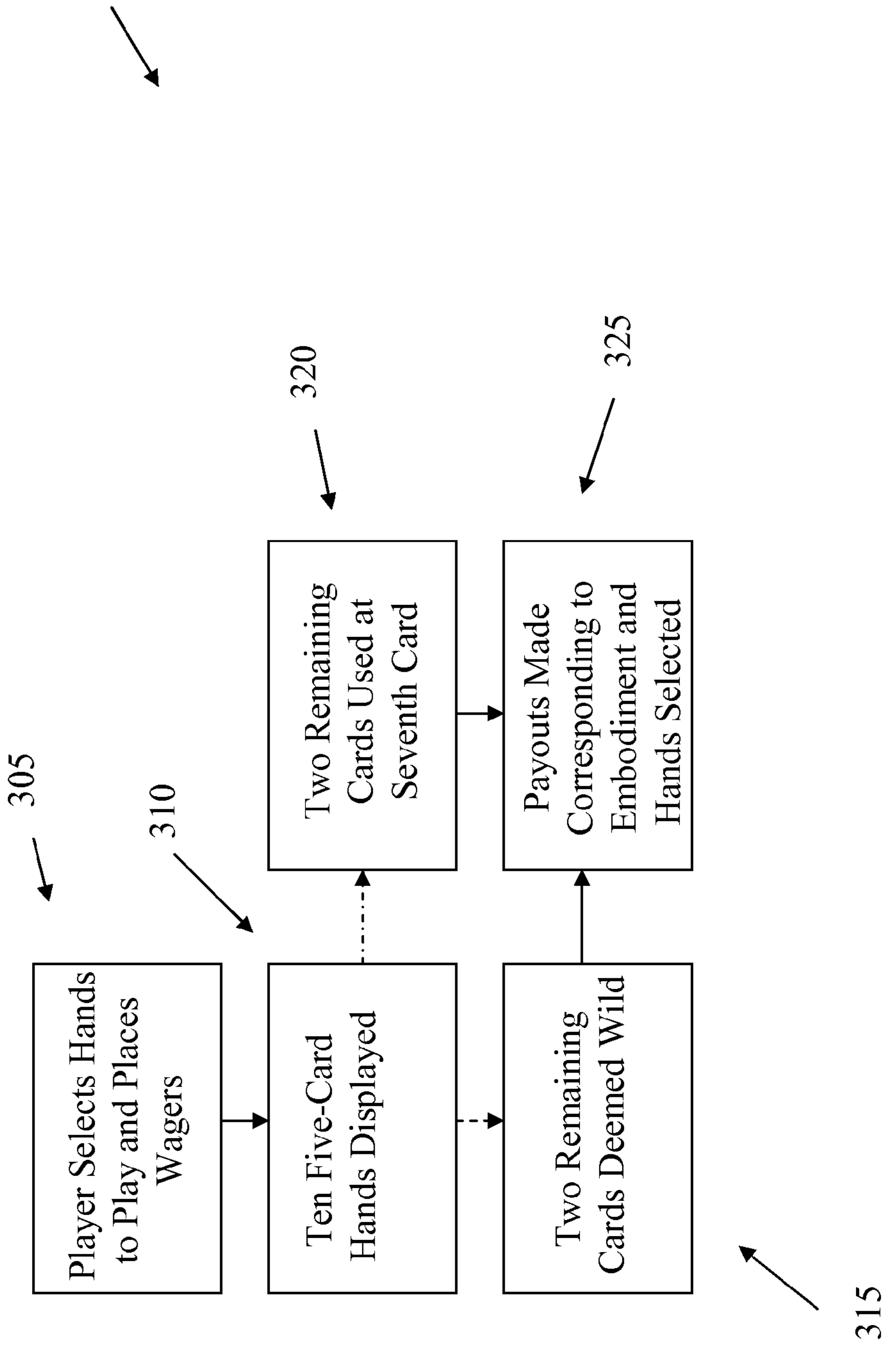
FIG. 6 illustrates a flow chart detailing a video poker game methodology according to one embodiment of the present invention.

FIG. 6 shows a flow chart 300 detailing one methodology according to the embodiments of the present invention. At 305, players select hands to play and places corresponding wagers. At 310, ten, five-card hands are displayed. In one embodiment, at 315, the two remaining cards are deemed wild cards. In another embodiment, at 320, the two remaining cards are deemed the sixth and seventh cards. It is also conceivable that the two remaining cards are deemed wild and sixth and seventh cards in the same play. At 325, payouts are made corresponding to the embodiment of the present invention.

The embodiments of the present invention may also utilize a modified deck playing cards including one or more jokers as wild cards.

The embodiments of the present invention are facilitated by a electronic gaming device in the form of a video poker machine, server-based gaming system, global computer network and the like. A processor or similar device is programmed to control the video poker game by randomizing cards, displaying the same on a game monitor. Players may interact with the video poker game via a game interface in the form of buttons, switches, keys, touch screen or other input devices. With server-based system, game software may be accessed via wired or wireless connection and accomplished through hand-held devices, computer terminals, and the like. Those skilled in the art will understand the embodiments of the present invention may be facilitated using the same technologies used to facilitate conventional video poker.

Although the invention has been described in detail with reference to several embodiments, additional variations and modifications exist within the scope and spirit of the invention as described and defined in the following claims.

I claim:

1. A video poker game method facilitated by an electronic gaming device comprising:

processor-implemented steps of:

accepting player wagers;

displaying on a gaming device screen ranks and suits of said ten, five-card poker hands from a deck of playing cards including at least fifty-two cards ranked from two through ace of hearts, diamonds, spades and clubs, each of said ten, five-card poker hands formed of unique cards from said deck of playing cards;

displaying proximate to said ten, five-card poker hands, ranks and suits of two remaining cards from said deck of playing cards;

designating as wild cards one or both ranks associated with said two remaining cards from said deck of fifty-two playing cards; and providing awards based on a strength of said one or more of said displayed ten, five-card poker hands.

2. The method of claim 1 further comprising allowing a player to select one more hands to play draw poker prior to ranks and suits of any cards being displayed.

3. The method of claim 1 further comprising allowing a player to select one or more hands to wager on prior to any card ranks and suits being displayed.

4. A video poker game method facilitated by an electronic gaming device comprising:

processor-implemented steps of:

displaying on a gaming device screen ten, five-card, face-down, poker hands from a deck of playing cards including at least fifty-two cards ranked from two through ace of hearts, diamonds, spades and clubs, each of said ten five-card poker hands formed of unique cards from said deck of playing cards;

allowing a player to select via a user interface one or more of said ten, five-card, face-down poker hands to wager on;

displaying on said game screen ranks and suits of at least the selected one or more of said ten, five-card, face-down poker hands;

displaying proximate to said ten, five-card poker hands, ranks and suits of two remaining cards from said deck of playing cards;

designating as wild cards one or both ranks associated with said two remaining cards from said deck of fifty-two playing cards; and providing awards based on a strength of said one or more selected ones of said revealed ten, five-card, face-down poker hands.

5. The method of claim 4 further comprising revealing all ten, five-card, face-down poker hands regardless of which ones of said ten, five-card, face-down poker hands said player selects.

* * * * *